(12) United States Patent
Bukhary et al.

(10) Patent No.: US 10,918,462 B1
(45) Date of Patent: Feb. 16, 2021

(54) TOOL FOR REMOVING ORTHODONTIC O-RINGS

(71) Applicant: KING SAUD UNIVERSITY, Riyadh (SA)

(72) Inventors: Ferdous Mohammed Taher Bukhary, Riyadh (SA); Mohammed Taher Mulla Akram Bukhary, Riyadh (SA); Sahar Faisal Sharaf Albarakati, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/920,621

(22) Filed: Jul. 3, 2020

(51) Int. Cl.
*A61C 7/30* (2006.01)

(52) U.S. Cl.
CPC .................... *A61C 7/306* (2013.01)

(58) Field of Classification Search
CPC ........... A61C 7/306; A61C 7/02; A61C 7/026; A61C 3/00
See application file for complete search history.

(56) References Cited

U.S. PATENT DOCUMENTS

| | | | |
|---|---|---|---|
| 4,106,374 A | 8/1978 | Dragan | |
| 4,127,940 A | 12/1978 | Shilliday | |
| 4,813,120 A | 3/1989 | Fournier | |
| 4,843,668 A | 7/1989 | Bonder | |
| 5,075,945 A | 12/1991 | Krzecki | |
| 5,564,175 A | 10/1996 | Nejad | |
| 5,676,544 A * | 10/1997 | Urban | A61C 3/00 433/147 |
| 5,738,512 A | 4/1998 | Cho | |
| 5,918,337 A | 7/1999 | Evling et al. | |
| 9,770,316 B1 * | 9/2017 | Speed | A61C 17/22 |
| 9,872,744 B2 | 1/2018 | Bukhary et al. | |

OTHER PUBLICATIONS

"Zoro O Ring Tool"; printed on Apr. 13, 2020 from https://www.zoro.com/zoro-select-o-ring-tool-2-pieces-wwg-disp-ortoolb/i/G0688843/.

* cited by examiner

*Primary Examiner* — Heidi M Eide
(74) *Attorney, Agent, or Firm* — Nath, Goldberg & Meyer; Richard C. Litman

(57) ABSTRACT

The tool for removing orthodontic O-rings includes a handle, which is adapted for gripping by an orthodontist and has opposed first and second ends, a neck and a hooked head. The neck has opposed first and second ends, and the second end thereof is secured to the first end of the handle. The hooked head has free and fixed ends, and the fixed end is secured to the first end of the neck. The free end of the hooked head defines a sharp tip. An annular flange is located at an interface between the fixed end of the hooked head and the first end of the neck. The annular flange has a diameter greater than a diameter of the fixed end of the hooked head and greater than a diameter of the first end of the neck.

4 Claims, 3 Drawing Sheets

TOOL FOR REMOVING ORTHODONTIC O-RINGS

BACKGROUND

1. Field

The disclosure of the present patent application relates to orthodontic tools and appliances, and particularly to a tool for removing orthodontic O-rings used to retain archwires on orthodontic braces.

2. Description of the Related Art

Orthodontics is a dental specialty that applies mechanical forces to move malpositioned teeth into their correct positions using brackets, archwires, and elastics. Each bracket is attached to a respective tooth surface and embraces the archwire. The brackets carry the elastics and auxiliaries, and transmit the forces generated by the archwires, elastics or springs to the tooth structures. The archwire generates forces to move the teeth and guide them to the correct positions. An orthodontic bracket is a relatively tiny device formed from a base, which is configured to be attached to the tooth surface; a body mounted on the base; a horizontally oriented slot for receiving the archwire; four tie-wings, which form the walls of the slot; and four tie-wing hooks. The main function of the bracket is to hold the archwire within the horizontal slot by an elastomeric O-ring that is hooked under the tie-wings at four points in order to fasten the archwire in place.

The elastomeric O-ring (also known as an "elastomeric modulus" or "elastomeric ligature") is a small, circular, ring-shaped elastic member used during orthodontic treatments to fasten the orthodontic archwire into the brackets. The archwire is seated into the slot of the bracket and held in place by hooking the elastomeric O-ring under the tie-wings at four points per bracket. Typically, 16 to 20 brackets are bonded to the patient's teeth. In the next visit, typically after 4 or 6 weeks, the archwire is replaced by a new archwire, thus requiring the removal of elastomeric O-rings from the brackets.

At present, there is no device specifically designed to remove the O-rings from the brackets, and orthodontists presently use a variety of different instruments with hooked heads, such as dental explorers, to remove the O-rings. The O-rings are removed from the patient's teeth individually, one after the other, by unhooking each O-ring from under the respective tie-wings of each bracket. The removed O-rings are released, one by one, and collected in a working tray or the like, typically being left free to scatter around the tray and intermingle with the different instruments in the treatment tray.

In addition to the problems inherent with loose and scattered O-rings, the used O-rings lose their elastic properties through aging or biodegradation and are saturated with saliva, food debris and microorganisms, which may include bacteria or viruses. Thus, the contact between the removed O-rings and the instruments can lead to contamination and cross-infection. Thus, a tool for removing orthodontic O-rings solving the aforementioned problems is desired.

SUMMARY

The tool for removing orthodontic O-rings includes a handle, which is adapted for gripping by an orthodontist and has opposed first and second ends, a neck and a hooked head. The neck has opposed first and second ends, and the second end thereof is attached to or integral with the first end of the handle. The hooked head has free and fixed ends. The fixed end is attached to or integral with the first end of the neck. The free end of the hooked head defines a sharp tip. An annular flange is located at an interface between the fixed end of the hooked head and the first end of the neck. The annular flange has a diameter greater than the diameter of the fixed end of the hooked head and greater than the diameter of the first end of the neck.

In use, the orthodontist uses the sharp tip of the free end of the hooked head to engage and remove an orthodontic O-ring from the wings of an orthodontic bracket. The removed O-ring initially rests on the hooked head, blocked from free movement towards the neck by the annular flange, which preferably has a diameter slightly larger than a diameter of the orthodontic O-ring. The orthodontist can then use his or her finger to slide the orthodontic O-ring over the annular flange until it seats on the neck. The neck may have a tapering profile such that the diameter of the first end of the neck is less than a diameter of the second end of the neck. The annular flange defines a collar or retainer that prevents the used O-ring(s) from sliding down onto the hooked head, and the neck may have a length sufficient to hold up to twenty used O-rings thereon. Thus, the removed O-rings may be retained between the annular flange and the second end of the neck until the orthodontist removes them from the tool.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
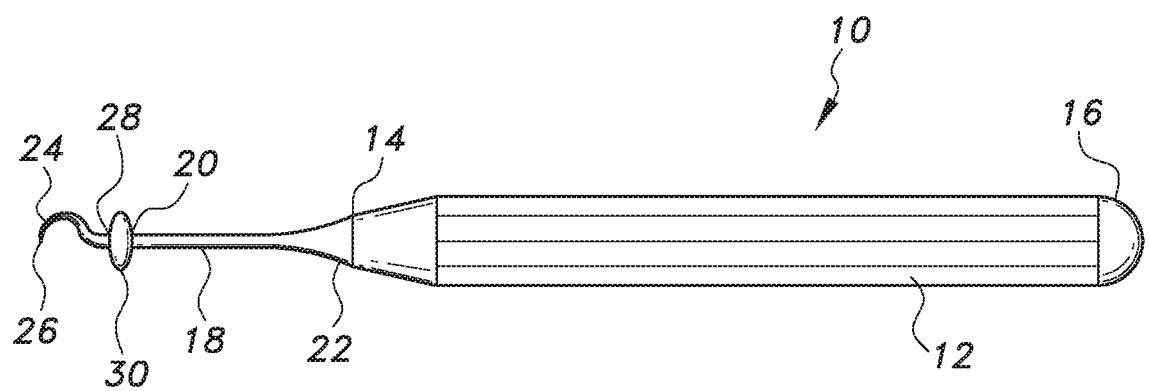
FIG. 1 is a plan view of a tool for removing orthodontic O-rings.

As shown in FIG. 1, the tool for removing orthodontic O-rings 10 includes a handle 12, which is adapted for gripping by an orthodontist and has opposed first and second ends 14, 16, respectively, a neck 18 and a hooked head 24. The neck 18 has opposed first and second ends 20, 22, respectively, and the second end 22 is attached to or integral with the first end 14 of handle 12. It should be understood that the overall dimensions and configuration of the handle 12 are shown for exemplary purposes only. Similarly, although the neck 18 preferably has a tapering profile, as will be described in greater detail below, it should be understood that the overall dimensions and configuration of the neck 18 are shown for exemplary purposes only. It should be further understood that the tool for removing orthodontic O-rings 10 may be formed from any suitable type of material, such as stainless steel or the like, for permanent use, or may be disposable, being made of plastic for single use.

The hooked head 24 has free and fixed ends 26, 28, respectively. The fixed end 28 is attached to or integral with the first end 20 of the neck 18. The free end 26 of the hooked head 24 defines a sharp tip, as shown. It should be understood that the overall dimensions and configuration of the hooked head 24 are shown for exemplary purposes only. An annular flange 30 defining a collar or retainer is located at the interface between the fixed end 28 of the hooked head 24 and the first end 20 of the neck 18. Although shown as having a bulbous contour, it should be understood that the overall dimensions and configuration of the annular flange 30 are shown for exemplary purposes only. The annular flange 30 has a diameter greater than the diameter of the fixed end 28 of the hooked head 24 and greater than the diameter of the first end 20 of the neck 18.

Figure 2A:
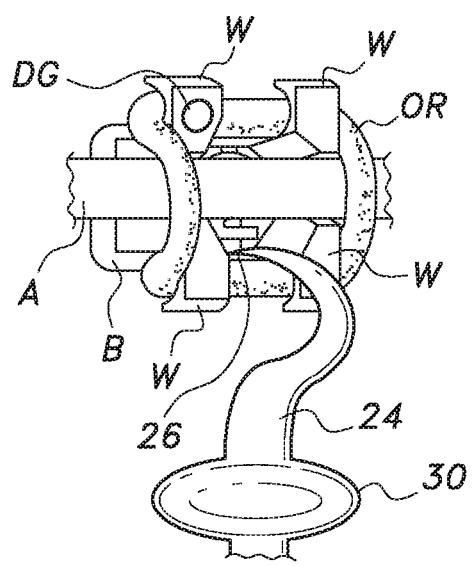
FIG. 2A is a partial environmental perspective view of the tool for removing orthodontic O-rings used with an incisal approach for removing an orthodontic O-ring from an orthodontic bracket.

In use, the orthodontist uses the sharp tip of the free end 26 of the hooked head 24 to engage and remove an orthodontic O-ring OR from the tie-wings W of an orthodontic bracket B. It should be understood that the orthodontist may use a variety of different methods to remove the O-ring OR. For example, FIG. 2A illustrates an incisal approach for removing an O-ring OR from the tie-wings W of the orthodontic bracket B, ultimately for freeing an archwire A from the orthodontic bracket B. The sharp tip of the free end 26 is inserted in the vertical keyhole groove of the orthodontic bracket B to unhook the O-ring OR from under the tie-wings W. In order to illustrate the orientation of FIG. 2A, the circular structure DG indicates the disto-gingival side of the orthodontic bracket B.

Figure 2B:
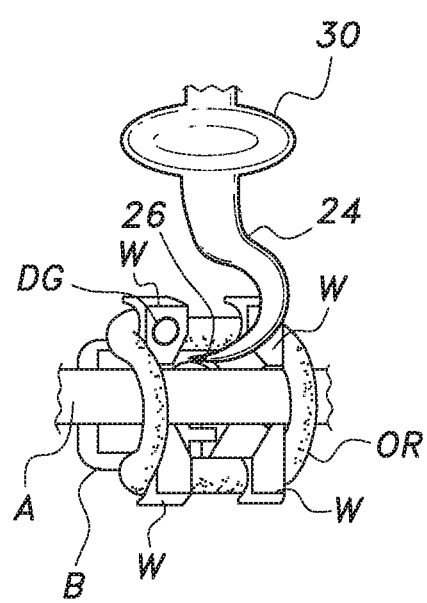
FIG. 2B is a partial environmental perspective view of the tool for removing orthodontic O-rings used with a gingival approach for removing an orthodontic O-ring from an orthodontic bracket.
Figure 2C:
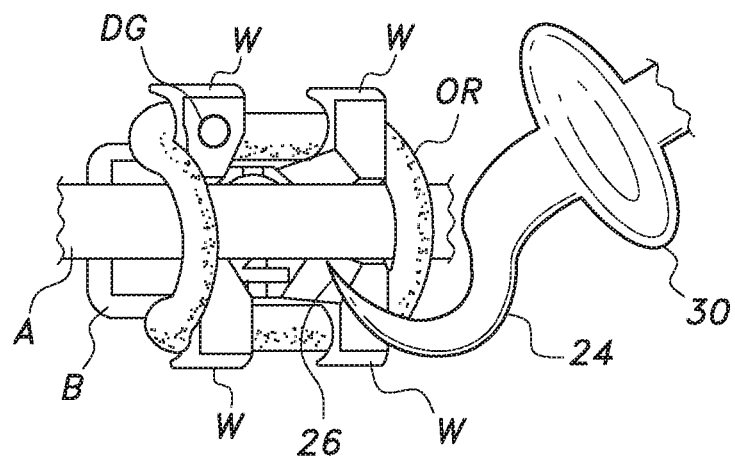
FIG. 2C is a partial environmental perspective view of the tool for removing orthodontic O-rings used with a mesial or distal approach for removing an orthodontic O-ring from an orthodontic bracket.

In FIG. 2B, a gingival approach is shown for removing O-ring OR from tie-wings W of orthodontic bracket B, ultimately for freeing archwire A from the orthodontic bracket B. As in the previous example, the sharp tip of the free end 26 is inserted in the vertical keyhole groove of the orthodontic bracket B to unhook the O-ring OR from under the tie-wings W. FIG. 2C shows a mesial or distal approach for removing O-ring OR from tie-wings W of orthodontic bracket B, ultimately for freeing archwire A from the orthodontic bracket B. In this example, the sharp tip of the free end 26 is inserted in the triangular cutout of the orthodontic bracket B and moved to unhook the O-ring OR from under the tie-wings W.

Figure 3:
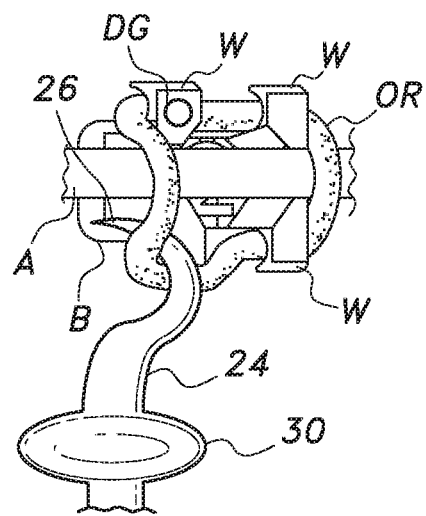
FIG. 3 is a partial environmental perspective view of the tool for removing orthodontic O-rings, shown unhooking an orthodontic O-ring from under an incisal-distal tie-wing of an orthodontic bracket.
Figure 4:
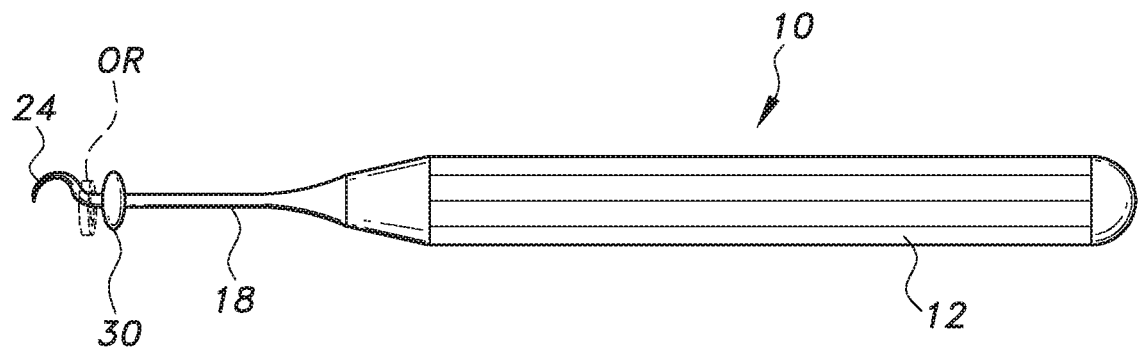
FIG. 4 is a plan view of the tool for removing orthodontic O-rings, shown with a removed O-ring (shown in phantom) in an initial position.
Figure 5:
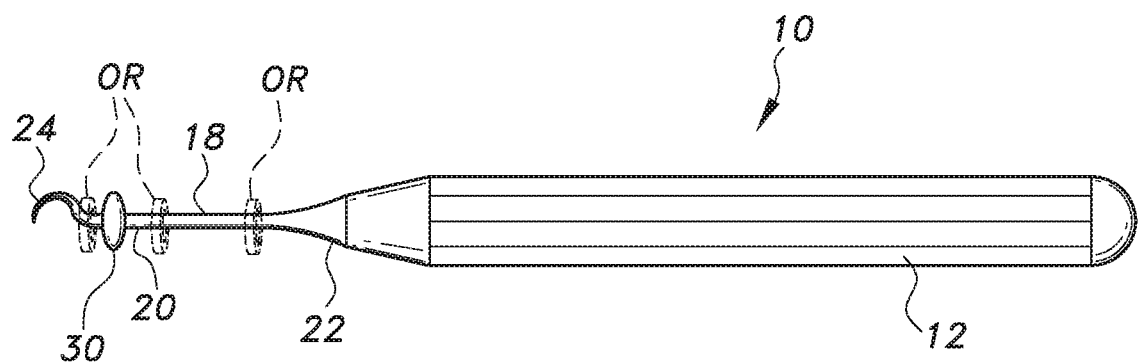
FIG. 5 is a plan view of the tool for removing orthodontic O-rings, shown with two removed O-rings (shown in phantom) in stored or captured position, and a third removed O-ring (shown in phantom) in the initial position of FIG. 4.
Figure 6:
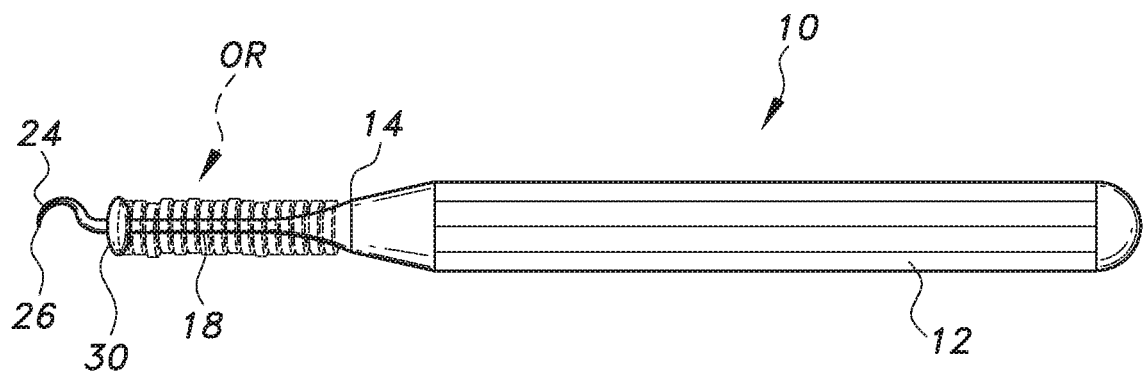
FIG. 6 is a plan view of the tool for removing orthodontic O-rings, shown with a plurality of removed O-rings (shown in phantom) in the stored or captured position.

FIG. 3 shows the sharp tip of the free end 26 being used to unhook O-ring OR from under the incisal-distal tie-wings W of an upper lateral incisor bracket. In the example shown in FIG. 2A-FIG. 3, the orthodontic bracket B has four tie-wings W. In practice, the orthodontist unhooks the O-ring OR from the first tie-wing, then moves to the second tie-wing, etc. As shown in FIG. 4, the removed O-ring OR initially rests on the hooked head 24, blocked from free movement towards the neck 18 by the annular flange 30, which preferably has a diameter slightly larger than the diameter of the orthodontic O-ring OR. The orthodontist can then use his or her finger to slide the orthodontic O-ring OR over the annular flange 30 until it seats on the neck 18. FIG. 5 shows two such O-rings OR already slid over annular flange 30, with a third O-ring OR ready to be slid over annular flange 30 to seat on the neck 18. As shown, the neck 18 may have a tapering profile such that the diameter of the first end 20 of the neck 18 is less than the diameter of the second end 22 of the neck 18, i.e., the second end 22 of the neck 18 has a frustoconical taper gradually merging with the frustoconical taper of the first end 14 of the handle 12. Thus, the removed O-rings OR may be retained between the annular flange 30 and the second end 22 of neck 18 until the orthodontist removes them from the tool 10. As shown in FIG. 6, the orthodontist can continuously remove the O-rings OR from their respective brackets, collecting them one after the other on the neck 18 of tool 10 without stopping until all of the O-rings OR have been removed. At that time, the orthodontist slides the O-rings OR back over the annular flange 30 for removal from tool 10.

It is to be understood that the tool for removing orthodontic O-rings is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A tool for removing orthodontic O-rings, comprising:
   a handle having opposed first and second ends, wherein the first end is configured to define a frustoconical peripheral surface;
   a hooked tool head having a free end and a fixed end, the free end defining a hook terminating in a sharp tip; and
   an elongated neck having opposed first and second ends, the second end of the neck being attached to the first end of the handle, the fixed end of the head being attached to the first end of the neck;
   an annular flange disposed adjacent the juncture of the fixed end of the head and the first end of the neck, the annular flange having a diameter greater than either of the fixed end of the head or the first end of the neck, wherein the first end of the neck has diameter less than the diameter of the second end of the neck, further wherein the second end of the neck being configured to define a frustoconical tapered configuration merging into the frustoconical peripheral surface of the first end of the handle;
   whereby the sharp tip of the hook is adapted for removing used orthodontic O-rings from brackets supporting an archwire, the O-rings being raised over the annular flange and seated on the elongated neck of the tool, the annular flange preventing the used O-rings seated on the neck from sliding back down onto the head.

2. The tool for removing orthodontic O-rings according to claim 1, wherein the tool is made from stainless steel.

3. The tool for removing orthodontic O-rings according to claim 1, wherein the tool is made from plastic.

4. A method of removing a plurality of orthodontic O-rings from brackets supporting an archwire in a patient's mouth using the tool according to claim 1, comprising the steps of:
   successively inserting the sharp tip at the free end of the head of the tool through a first O-ring of the plurality of orthodontic O-rings and unhooking the first O-ring from each tie-wing of the bracket to remove the first O-ring from the bracket onto the hook defined by the head of the tool;

pulling the first O-ring over the annular flange to seat the first O-ring on the neck of the tool; and repeating the successively inserting and pulling steps for each successive O-ring in the plurality of O-rings in order to temporarily retain the plurality of orthodontic O-rings on the neck of the tool as the O-rings are removed pending disposal of the removed O-rings.

* * * * *